US012568559B2

(12) United States Patent
Mollmann

(10) Patent No.: US 12,568,559 B2
(45) Date of Patent: Mar. 3, 2026

(54) SMART ELECTROMAGNETIC INDUCTION WIRELESS CHARGING AND COOKING DEVICE

(71) Applicant: Chad Mollmann, Greenwood, IN (US)

(72) Inventor: Chad Mollmann, Greenwood, IN (US)

( * ) Notice: Subject to any disclaimer, the term of this patent is extended or adjusted under 35 U.S.C. 154(b) by 765 days.

(21) Appl. No.: 18/070,933

(22) Filed: Nov. 29, 2022

(65) Prior Publication Data

US 2023/0180356 A1 Jun. 8, 2023

Related U.S. Application Data

(60) Provisional application No. 63/264,900, filed on Dec. 3, 2021.

(51) Int. Cl.
*H05B 6/12* (2006.01)
*H05B 1/02* (2006.01)
(Continued)

(52) U.S. Cl.
CPC ......... *H05B 6/1263* (2013.01); *H05B 1/0225* (2013.01); *H05B 1/0266* (2013.01);
(Continued)

(58) Field of Classification Search
CPC ............... H05B 1/0225; H05B 1/0266; H05B 2213/07; H05B 6/04; H05B 6/065; H05B 6/1263; H05B 6/1272
(Continued)

(56) References Cited

U.S. PATENT DOCUMENTS 3,843,857 A * 10/1974 Cunningham ......... H05B 6/062 219/622
4,980,539 A * 12/1990 Walton ................ A47J 36/2461 219/710
6,291,805 B1 9/2001 Simeray et al.

FOREIGN PATENT DOCUMENTS

CN 208241383 U 12/2018
KR 20-0475465 Y1 12/2014
(Continued)

OTHER PUBLICATIONS

International Searching Authority (ISA/US); Notification of Transmittal of International Search Report and the Written Opinion of the International searching Authority, or The Declaration; Date: Mar. 9, 2023; pp. 1-50.

(Continued)

*Primary Examiner* — Quang T Van
(74) *Attorney, Agent, or Firm* — Taft Stettinius & Hollister LLP

(57) ABSTRACT

A cooking device includes a housing including a non-ferromagnetic surface and a lower shell positioned below the non-ferromagnetic surface. The cooking device also includes an induction cooking coil, a battery assembly configured to provide power to the induction cooking coil via a circuit board assembly, and a heat sink surrounding the battery assembly and the circuit board assembly. The induction cooking coil, the battery assembly, and the circuit board assembly are enclosed by the housing. The cooking device also includes a controller operatively coupled to the circuit board assembly and configured to switch from usage of a first driver circuit of the circuit board assembly to a second driver circuit of the circuit board assembly to power the induction cooking coil.

20 Claims, 9 Drawing Sheets

(51) Int. Cl.
*H05B 6/04* (2006.01)
*H05B 6/06* (2006.01)

(52) U.S. Cl.
CPC ............... *H05B 6/04* (2013.01); *H05B 6/065* (2013.01); *H05B 2213/07* (2013.01)

(58) Field of Classification Search
USPC ....... 219/622, 620, 621, 624, 626, 627, 635, 219/647, 650, 670, 672
See application file for complete search history.

(56) References Cited

FOREIGN PATENT DOCUMENTS

| | | | |
|---|---|---|---|
| KR | 101668226 | B1 | 10/2016 |
| KR | 102163259 | B1 | 10/2016 |

OTHER PUBLICATIONS

European Patent Office, Munich Germany; Supplementary European Search Report; Corresponding Application No. EP 22902063.1; Date: Oct. 11, 2025; pp. 6.

* cited by examiner

SMART ELECTROMAGNETIC INDUCTION WIRELESS CHARGING AND COOKING DEVICE

RELATED APPLICATIONS

This application claims priority to U.S. Provisional Application Ser. No. 63/264,900, filed Dec. 3, 2021, the disclosure of which is hereby incorporated by reference in its entirety.

FIELD OF THE DISCLOSURE

The present disclosure relates to one or more induction cooking devices and, in particular, to systems and methods for one or more battery-powered induction cooking devices.

BACKGROUND OF THE DISCLOSURE

Cooking devices are used in a variety of applications. For example, cooking devices may be used in the home, at locations away from the home, or during travel. Conventional cooking devices often require use of gas or electrical elements during cooking. Conventional cooking devices make use of indirect radiation, convection, or thermal conduction to heat a cooking vessel atop a cooking surface. These forms of cooking are inefficient compared to induction cooking, which uses direct heating of a cooking vessel. For induction cooking, a cooking vessel with a ferromagnetic base may be placed atop a non-ferromagnetic surface with a coil of copper wire having an alternating electric current passing therethrough positioned below the non-ferromagnetic surface. The resulting oscillating magnetic field wirelessly induces an electrical current in the cooking vessel resulting in heating of the cooking vessel.

Applications for conventional induction cooking devices are limited due to the structure and arrangement of components of conventional induction cooking devices. Therefore, what is needed is the induction cooking systems and methods, as described herein.

SUMMARY

In an illustrative embodiment, a cooking device comprises: a longitudinal axis extending vertically through the cooking device; a housing including a non-ferromagnetic surface extending in a radial direction perpendicular to the longitudinal axis; an induction cooking coil positioned adjacent to and below the non-ferromagnetic surface; a battery assembly configured to provide power to the induction cooking coil; a heat sink including a collar having receiving walls spaced radially outward of the battery assembly; a circuit board assembly positioned radially outward of the battery assembly and radially inward of the collar; wherein each circuit board of the circuit board assembly is coupled to a receiving wall; and wherein the battery assembly, the induction cooking coil, and the circuit board assembly, are enclosed by the housing.

In some embodiments, the housing further comprises a lower shell positioned below the non-ferromagnetic surface; the heat sink includes a floor coupled to the collar and positioned radially inward of the lower shell; and the floor of the heat sink cooperates with the lower shell and the non-ferromagnetic surface to form the housing.

In some embodiments, the housing further comprises a lower shell having a continuous side wall positioned radially outward of the heat sink. In some embodiments, the housing further comprises a retaining ring abutting the lower shell and the non-ferromagnetic surface; and non-ferromagnetic surface is positioned radially inward of the retaining ring.

In some embodiments, the receiving walls extend radially outward from the longitudinal axis as the receiving walls extend vertically upward toward the non-ferromagnetic surface such that the receiving walls are not parallel to the longitudinal axis.

In some embodiments, the cooking device further comprises a plurality of cooling fins positioned radially outward of the heat sink; and each cooling fin of the plurality of cooling fins is coupled to a receiving wall of the heat sink. In some embodiments, each cooling fin of the plurality of cooling fins includes: a first surface that is planar and coupled to a receiving wall of the heat sink; a second surface opposite the first surface; and raised walls extending radially outward from the second surface, the raised walls defining channels therebetween. In some embodiments, the raised walls vary in height from a lesser height at first and second sides of each cooling fin to a greater height at a middle portion of each cooling fin, the middle portion being positioned between the first and second sides of each cooling fin, such that each cooling fin has a convex shape.

In some embodiments, the housing includes lower apertures and upper apertures that are positioned above and not aligned with the lower apertures; and the upper apertures and the lower apertures facilitate airflow between an interior and an exterior of the housing. In some embodiments, the cooking device further comprises: an induction charging coil spaced apart from the induction cooking coil and configured to provide power to the battery assembly via the circuit board assembly.

In some embodiments, the cooking device further comprises: a controller operatively coupled to the circuit board assembly; wherein a first driver circuit of the circuit board assembly and a second driver circuit of the circuit board assembly are each configured to receive power from the battery assembly and provide the received power to the induction cooking coil; wherein the controller is configured to switch from usage of the first driver circuit to the second driver circuit to power the induction cooking coil; and wherein the first driver circuit and the second driver circuit are configured to provide power to the induction cooking coil at the same voltage.

In some embodiments, the cooking device further comprises: a sensor operatively coupled to the controller and configured to measure a temperature of the first driver circuit; wherein the controller is configured to switch from usage of the first driver circuit to the second driver circuit to power the induction cooking coil in response to: receiving a signal from the sensor indicative of the measured temperature of the first driver circuit, and determining that the measured temperature of the first driver circuit is outside an acceptable temperature range. In some embodiments, the controller is configured to switch from usage of the first driver circuit to the second driver circuit to power the induction cooking coil after a predetermined amount of time to induce airflow within the housing.

In another illustrative embodiment, a cooking device comprises: a longitudinal axis extending vertically through the cooking device; a housing including: a circular non-ferromagnetic surface comprised of a first material and extending in a radial direction outward from and perpendicular to the longitudinal axis, and a cylindrical lower shell extending vertically downward from the non-ferromagnetic surface and comprised of a second material; an induction cooking coil enclosed by the housing and positioned below the non-ferromagnetic surface; a battery assembly enclosed by the housing and configured to provide power to the induction cooking coil via a circuit board assembly; and a heat sink including a collar positioned radially outward of and surrounding the battery assembly; wherein the circuit board assembly is coupled to a radially inner surface of the collar of the heat sink. In some embodiments, the heat sink includes a floor coupled to the collar; and the floor of the heat sink cooperates with the non-ferromagnetic surface and the cylindrical lower shell to form the housing.

In some embodiments, the cooking device further comprises: a controller operatively coupled to the circuit board assembly; wherein the controller is configured to switch from usage of a first driver circuit of the circuit board assembly to a second driver circuit of the circuit board assembly to power the induction cooking coil; and wherein the first driver circuit and the second driver circuit are configured to provide power to the induction cooking coil at the same voltage. In some embodiments, the cooking device further comprises raised walls extending radially outward away from a radially outer surface of the collar; wherein the raised walls form a plurality of channels therebetween.

In another illustrative embodiment, a cooking device comprises: a longitudinal axis extending vertically through the cooking device; a housing including: a non-ferromagnetic surface that extends in a radial direction perpendicular to the longitudinal axis, and a lower shell that extends vertically downward from the non-ferromagnetic surface; an induction cooking coil positioned below the non-ferromagnetic surface; a battery assembly configured to provide power to the induction cooking coil via a circuit board assembly; a heat sink surrounding the battery assembly and the circuit board assembly; and a controller operatively coupled to the circuit board assembly; wherein the controller is configured to switch from usage of a first driver circuit of the circuit board assembly to a second driver circuit of the circuit board assembly to power the induction cooking coil; and wherein the induction cooking coil, the battery assembly, and the circuit board assembly are enclosed by the housing.

In some embodiments, the circuit board assembly includes: a first circuit board on which the first driver circuit is located; and a second circuit board on which the second driver circuit is located. In some embodiments, the circuit board assembly includes: the first driver circuit, the second driver circuit, and at least one voltage change circuit operatively coupled to the first driver circuit and the second driver circuit; wherein the at least one voltage change circuit is configured to receive power from the battery at a first voltage and provide power to the first driver circuit and the second driver circuit at a second voltage that is greater than the first voltage; wherein the at least one voltage change circuit is configured to provide power to only one of the first driver circuit and the second driver circuit at a time; and wherein the first driver circuit and the second driver circuit are each configured to provide power to the induction cooking coil at the second voltage.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 3 shows a heat sink surrounding a battery assembly and having a circuit board assembly coupled to an inner surface thereof and a plurality of cooling fins coupled to an outer surface thereof; and FIG. 3 shows the lower shell surrounding the heat sink;

FIG. 6 shows the plurality of sensors operatively coupled to the controller;

Corresponding reference numerals are used to indicate corresponding parts throughout the several views.

DETAILED DESCRIPTION

Figure 1:
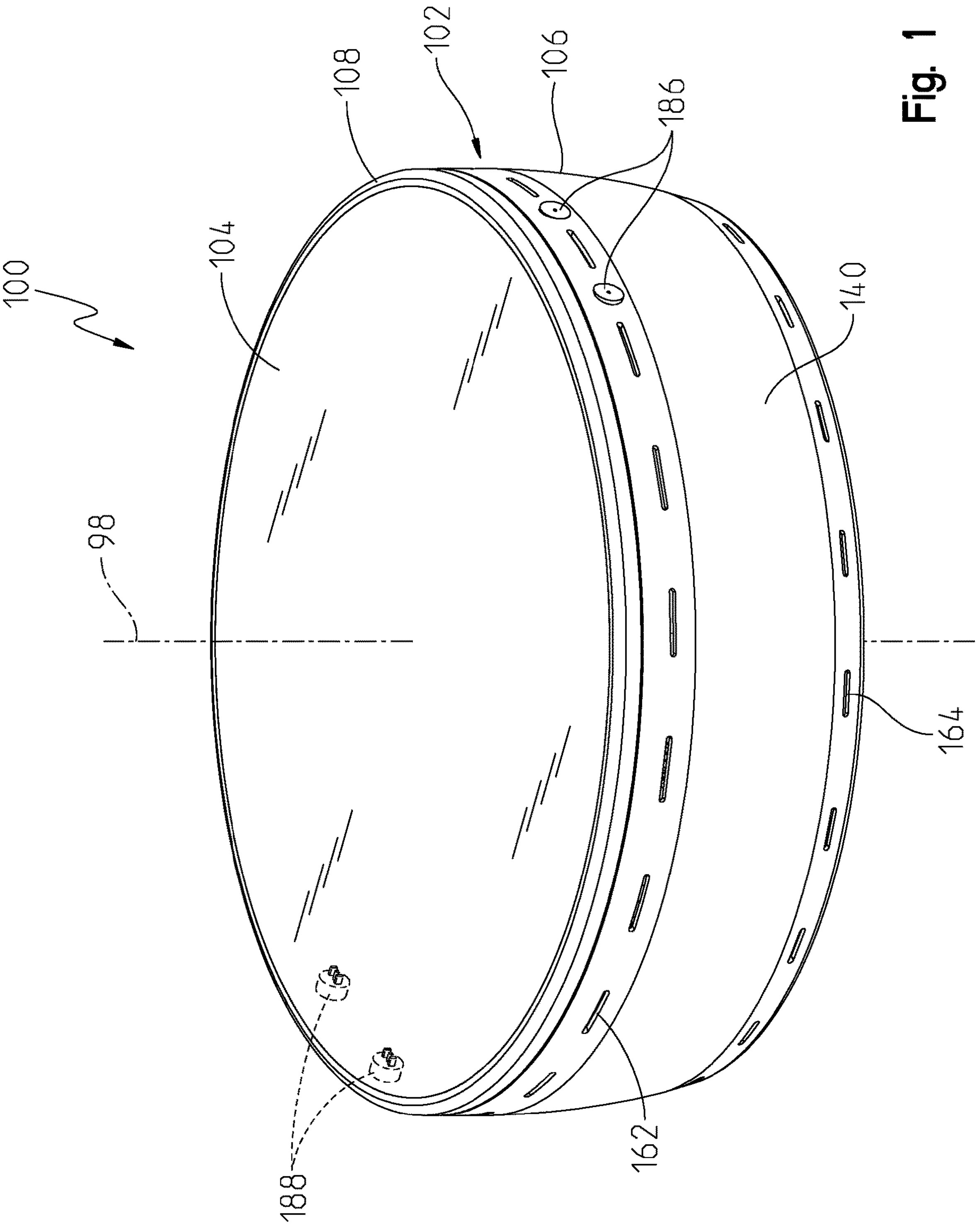
FIG. 1 is a top down perspective view of a cooking device showing that the cooking device includes a non-ferromagnetic surface and a lower shell that define a housing.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

The disclosure encompasses certain aspects of an electromagnetic induction wireless charging and cooking device, which may be referred to as an EIWCC or a cooking device. The EIWCC may include an auxiliary battery. Example docking stations for the EIWCC are contemplated by this disclosure. A griddle bridge for the EIWCC is also contemplated by this disclosure.

Induction cookers have most recently been utilized as a smart home appliance with the ability to link to a cooking application that can control the cooker automatically based on user inputs and preferences. In accordance with an exemplary embodiment of the present invention, an electromagnetic induction wireless charging and cooking device may include an app configured with a learning feature to store and memorize common uses of specific cooking vessels and common cooking recipes. The learning feature may be configured, based on the learning of certain characteristics of what substances are in a cooking pot, for example, to provide the user with quick choices for a cooking mode to switch into (e.g., for boiling water, frying, or some other pre-set operating condition). The EIWCC may also be configured to detect when liquid is boiling in order to reduce temperature and prevent boiling over conditions. This feature may be accomplished with sensors (e.g., a vibration sensor, temperature sensor, or other sensors) to be described in further detail below.

The EIWCC may provide portability and versatility when there is no plug, generator, or means to provide mains power or other cooking fuel/method. The EIWCC may also be used in the instance when all of the supplied power outlets are filled with other devices. Or, the EIWCC may be used when the weight or space requires a single appliance capable of cooking multiple varieties of recipes. In some forms, the network and connection features of the EIWCC may allow for a cooking class to take place virtually or in the same facility which may be lead and conducted by a video, live instructor, chef, or cooking professional. The EIWCC may also be used to connect with family and friends to share a home cooked meal together. The network feature and digital storage may also allow for recipes to be stored online for later use, for sharing with friends and family remotely. This may create a digital cookbook to share and spread with friends and family. It may also provide a means to share the usage that was accomplished with the EIWCC.

Energy efficiency of the EIWCC may also reduce the cost of cooking. Energy costs may also be reduced by the app automatically instructing the charging of the docking station when energy costs are lower to utilize later charging the EIWCC or auxiliary battery pack when energy costs are higher due to energy demand.

In some example forms, the EIWCC may be configured to determine a frequency of operation such that it can stay out of the range of human and animal hearing. Frequency settings may be operated via the app, configured with default settings or may be adjusted manually.

In some example forms, the EIWCC is operated wirelessly by use of and configured with a smart controller for voice and/or Bluetooth and/or Wi-Fi control and interaction between additional EIWCCs and/or the app on a smart device. It can also be paired with additional EIWCCs to form a single-use larger cooking surface or may be used independently yet capable of sharing a common timing and/or schedule to prepare a multi-pot dish. The wattage and frequency of the charging and cooking coils can be adjusted to suit different modes.

The smart controller can connect, control, and command using voice, Bluetooth, Wi-Fi, RFID, BLE, and/or NFC, whichever is best suited based on connection strength, user ease, and/or speed. The connection/pairing can be to either the controlling device or to another EIWCC. The connection/pairing to the controlling device can be new, learned or shared with another device. The EIWCC during initial use may automatically go into pairing mode to look for a controller, another EIWCC, voice command, and/or app command. The smart controller can be configured via voice command to the EIWCC device or through the app on a mobile device or tablet to control all of the functions and modes of the EIWCC when in operation. In some example forms, the smart controller commands may include operational features such as cooking time, cooking temperatures, timers, modes of cooking, frequency of current, power output, and charging of other devices. The app may also provide feedback data to help optimize the pre-set modes of the cooking device as well as the learning feature for different cooking recipes. Additionally, the app may be configured to connect to other users of the app to share recipes and cooking tips. In other example forms, the app may include user interface inputs to allow the user to setup the primary function of the EIWCC including but not limited to frequency and operating parameters.

In some example forms, the EIWCC may be configured or paired with QR identification. The top surface may include a display having a pattern such as a QR code which can be scanned by a device capable of reading QR codes and running the recommended app. In some implementations, the top surface display may have a pattern where the QR code may be scanned by a device capable of reading QR codes connected to a device capable of running the recommended app.

In some example forms, the EIWCC can be joined and linked together physically and/or virtually to create one large cooking surface capable of achieving one desired mode or creating zones for separate modes. EIWCCs can be separate or linked together virtually to create different cooking surfaces capable of achieving a desired outcome simultaneously, where the app and/or smart controller dictates the cooking times and temperatures of each EIWCC to align. For example, the EIWCCs may be configured where one is boiling water and another is simmering a sauce, or one may be searing meat and another steaming vegetables. The app and/or smart controller may be configured to regulate cooking temperature and times.

The EIWCC is a sealed self-contained electromagnetic induction cooking device as well as induction charging. In some example forms, the EIWCC may include a smart controller configured to store specific shapes and sizes of cooking vessels. In other example forms, the smart controller may be configured to store common cooking operations to provide cooking efficiency. For example, if an 8-inch pot is regularly placed on the EIWCC and the weight determined by a pressure sensor provided in the EIWCC aligns to the pot being somewhat filled with water, the EIWCC may be configured to notify the user that a boil water mode operation has been initiated. It shall be appreciated by persons skilled in the art that the EIWCC may be configured with integrated feedback sensors including, but not limited to, a temperature sensor, pressure sensor, vibration sensor, orientation sensor, microphone, and continuity sensor.

In some example forms, the EIWCC includes an induction cooking coil feature configured with an internal battery. The internal battery may be utilized as a function of alternating high frequency current. The output of the induction cooking coil may be adjusted in frequency and wattage as desired by mode or operating conditions. The induction cooking coil may also be adjusted as a zone, section, or portion of the cooking total surface area to provide optimal output for extending battery charge while performing a cooking task. Additionally, at least one section of an entire coil may provide another means of magnetic resonance coupling which may be used to charge any style or type of induction receiving device like, for example, a smart phone or light. In some forms, the EIWCC smart controller may be configured with a shape recognition function to avoid from heating inadvertently a cooking utensil not intended to be heated such as, but not limited to, a spoon, spatula, or knife.

An auxiliary battery pack may be usable in various orientations, as the primary function for the coil is charging one or more additional EIWCC, another auxiliary battery pack, another induction charging capable device, or itself on a docking station. The auxiliary battery pack, like the EIWCC, is a sealed self-contained electromagnetic induction charging device. The battery pack is charged by the means of induction charging and as closely as it can obtain magnetic resonance charging for efficient charging. The battery pack is comprised of cells and/or capacitors capable of storing and distributing the required power to the cooking coil(s) based on the mode of use or as directed by the user. The battery pack may also include Li-ion, Li—Po, Ni-Cad, and lead acid cells.

The docking station for the EIWCC may be in a pull-out cabinet where it is hanging/mounted and plugged into a power source. It shall be appreciated that the EIWCC or auxiliary battery pack may be mechanically or magnetically secured into place on the docking station for storage and charging. In other embodiments, a docking station may be provided with two charging coils to be used independently or simultaneously for charging one or more EIWCCs or auxiliary batteries. In another example embodiment, a portable docking station may be provided which may be capable of storing and charging the EIWCCs, auxiliary battery packs, as well as the griddle bridge with its internal battery. The portable docking station can have its own charging cord for charging the internal battery. The EIWCCs may be configured with an independent charging dock containing at least one charging coil and a cord by which to connect to a main power, solar cell, or other external battery pack or means of producing suitable means to provide charge/power to the docked/connected EIWCC or auxiliary battery pack. For example, a docking station of a fixed, mounted, and/or portable configuration containing at least one induction capable charging coil, a battery pack, a PCB and function capable of adjusting the incoming supplied power from the plug by means of any acceptable source (i.e., mains power, photovoltaic/solar power, generator, or power bank) may be provided to suitably charge the EIWCCs internal battery pack, griddle bridge, or an auxiliary battery pack via magnetic resonant coupling to achieve the most efficient and effective means of wirelessly charging. In some forms, the EIWCC may also be stacked on top of an auxiliary battery pack with at least one charging coil to either charge the EIWCCs or to be charged itself by the docking station. In some forms, the EIWCC may also have the ability to be connected physically or virtually to other EIWCCs. In some forms, the EIWCC may be configured with the necessary shape to optimize the joining of at least two or more EIWCCs for the purpose of creating a larger cooking surface. In some forms, the EIWCC may be configured with a regenerative heat energy recovery means to make use of waste heat from electronic components in the EIWCC for means of generating charge back into the batteries.

The auxiliary battery pack may be oriented relative to the EIWCC in a stacked position. In some forms, the EIWCC may also be stacked on top of an auxiliary battery pack with at least one charging coil to either charge the EIWCCs or to be charged itself by the docking station.

The EIWCC may include a ceramic glass top cover with a round shape and rolled edges. The EIWCC may include induction cooking coils on the working side of the EIWCC. The EIWCC may include a PCB. It shall be appreciated by persons skilled in the art that the PCB may include a plurality of components needed for the operation. The EIWCC may include insulation for the EIWCC which may include, but not limited to, a fiber mat, or other minimally thick option to avoid heating between PCB and other components of the assembly. The EIWCC may include one or more battery packs, separate from the auxiliary battery pack, which may be comprised of Li-ion cells and/or capacitors for energy storage. The EIWCC may include a plurality of heat pipes for transferring the generated heat from the PCB down to an integrated heat sink or part of a lower shell of the EIWCC. As suggested, the EIWCC may include a charging coil capable of high efficiency transfer between the docking station and/or the auxiliary battery pack. The EIWCC may include a lower formed and/or stamped shell which forms a cavity space for the heat sink and a magnetic feature or mechanical features that attach securely to the docking station and/or auxiliary battery pack. The EIWCC may include gripper pads to keep the EIWCC from slipping during use.

As suggested, the EIWCC includes at least one internal battery or battery pack, at least one wireless charging feature such as a coil, and at least one PCB including but not limited to, at least one BJT or MOSFET, one resistor, one capacitor, one diode, and one inductor. The EIWCC also includes at least one induction heating element such as a coil, an integrated heat sink (e.g., a cooling lower half shell) or an internal means of passively dissipating heat (e.g., heat pipes), a non-slip feature, a top surface such as a glass ceramic, at least one type of feedback sensor, a microphone, and an internal smart controller. In some forms, the top ceramic glass may be supportive to hold a cooking vessel. In other forms, the ceramic glass may be able to refract light emitted from at least one diode to produce patterns and/or zones and/or an entire top glass color to depict a current functioning mode of the EIWCC (e.g., cooking mode, charging mode, or light mode).

The EIWCC may include at least one PCB with smart capability to control and monitor the means of charging and discharging so as to reduce any issues caused by overcharging or over-temping. The PCB may be integrated into a coil independent induction cell feature with all necessary electrical components so it is an independent induction cooking coil, which may be but not limited to a cylindrical shape. The PCB may also include smart controlling features, commonly a processor configured to read and adjust the EIWCC as needed based on the feedback from the integrated sensors, but not limited thereto. The integrated feedback sensors may include at least one microphone, at least one speaker, at least one temperature sensor, at least one pressure sensor, at least one presence sensor, at least on vibration sensor, at least one orientation sensor, and at least one continuity sensor, but not limited thereto.

The upper shell (e.g., heat sink) and lower shell of the EIWCC may be made of suitable material and geometry for durability, usage, and function required to meet NSF-certified 1.5 foot drop resistance. The housing of the EIWCC may be but not limited to a round, square, rectangle, octagonal, or other shape capable of providing a surface suitable for a cooking vessel during operation. The lower shell may include a non-slip feature to keep it from sliding unintentionally when in operation or when moving a cooking vessel, device, or other intended item on the top surface. The non-slip feature may be, but is not limited to, gripper pads glued, mechanically fastened, or integrated into the lower shell.

The PCB may be integrated into a coil independent induction cell feature with all necessary electrical components so it is an independent induction cooking coil, which may be but not limited to a cylindrical shape. In a stack configuration, the EIWCC includes an LED; a working coil (e.g., for cooking); the capacitor; the MOSFET or switch; the resistor (e.g., a dynamic resistor possible); the smart controller; the one or more battery cells; and the charging coil. The EIWCC may include an upper electrical contact point and a lower contact point. From a top down view, one or more EIWCCs may be arranged in a grid-like pattern with a grid divider.

The cooking coil feature may be one or more wires coiled into a round section, or may be a woven pattern including one or more wires. In some form, it may be a grid of electrically conductive segments orchestrated to create the most optimum shape for the required function or cooking vessel. Additionally, the coil may be made of copper, copper alloy, other composite alloy, or a superconductor. In some embodiments, the EIWCC may include a weave configuration of a cooking coil. The weave configuration may include at least two independent layers (e.g., with horizontal and vertical links) functioning in opposite directions to create induced Eddy currents. The weave configuration may include several fibers/strands.

As suggested the EIWCC may be powered by an auxiliary battery. The auxiliary battery pack may include a positive feature for the charging coil of the EIWCC to coupled with. The auxiliary batter pack may couple with another auxiliary battery pack and/or the EIWCC. The insulation layer may include cutouts for heat pipes. It should be appreciated that the EIWCC may include a second charging coil.

The griddle bridge may, for example, be embodied as a dog bone or hourglass-shaped piece, and may connect with and fill in the space between two EIWCCs to create a larger cooking surface, for example, to accommodate larger cooking vessels. In some forms, the EIWCC may also have the ability to be connected physically or virtually (e.g., electrically) to other EIWCCs.

In some embodiments, the EIWCC may include a heat pipe connected to the PCB heat generating component. The heat pipe may be routed through an insulation layer to an integrated heat sink. The integrated heat sink may run around a portion of the perimeter of the lower shell. Thus, passive heat removal may be integrated into the lower shell. Passive heat removal may be accomplished using means such as, but not limited to heat pipes, vapor chambers, and heat sinks. In some forms, the EIWCC may include a regenerative heat energy recovery feature to make use of waste heat from the electronics to charge the batteries in order to prolong operating time or, in some instances, to provide additional cooling after the EIWCC is no longer in use. For example, a Peltier device or similar device may be used to create current when heat is input or passed on one side.

In some embodiments, the EIWCC may include heat pipes that are partially or completely encapsulated in a device capable of taking heat energy and transferring it to electrical energy. In one example, an additional heat sink component may be included to keep one side of the heat transfer device cool.

In some embodiments, the EIWCC may be docked (e.g., for charging) at a single docking station with the EIWCC and auxiliary battery stacked on a charging coil of the docking station. In some forms, the EIWCC may also be stacked on top of an auxiliary battery pack with at least one charging coil to either charge the EIWCC or to be charged itself by the docking station. In some embodiments, the EIWCC may be docked (e.g., for charging) at double docking station with the EIWCC and auxiliary battery charging on separate coils.

The EIWCC may be operated in accordance with a steps described herein. A mobile device may be operable to provide an App. The EIWCC may be paired with the mobile device. For example, a QR code on the EIWCC may scanned by the mobile device to facilitate pairing. Settings for the EIWCC may be adjusted in the App (e.g., via the mobile device).

In some embodiments, using the controller and/or sensors of the EIWCC, it may be determined whether additional EIWCCs or the bridge is nearby or coupled to the EIWCC. If it is determined that additional EIWCCs or the bridge is nearby or coupled to the EIWCC, a user may be prompted to indicate whether to operate the bridge or additional EIWCC. Settings for each EIWCC and the bridge may be adjusted in the App (e.g., via the mobile device).

In some embodiments, using the controller and/or sensors of the EIWCC, it may be determined whether there is a vessel on the top glass of the EIWCC. If there is a vessel on the top glass of the EIWCC, a frequency of the EIWCC may be determined. In some embodiments, a mode of operation of the EIWCC may be adjusted based on the determined frequency.

In some embodiments, using the controller and/or sensors of the EIWCC, it may be determined whether water has boiled out of a vessel onto the EIWCC. For example, sensors of the EIWCC may measure vibration, mass, and temperature and provide such measurements to the controller. The controller may receive a series of signals indicating that measured vibrations are occurring at a higher frequency than a standard frequency and a measured mass on the EIWCC increases (and subsequently that) measured vibrations decrease, measured temperature increases, and occurrences of vibrations at different frequency increase. If such signals are received by the controller, then the controller may generate an output to indicating that water has boiled out of a vessel onto the EIWCC. In response to receiving such signals, the controller may reduce the cooking temperature of the EIWCC.

In accordance with the above-described example embodiments and implementations, the EIWCC may include integrated passive cooling eliminating the need for openings, vents, or fans. The EIWCC may provide control by means of a smart controller, voice control, and/or app that eliminates the needs for buttons or knobs on the device. The EIWCC may be water resistant. The EIWCC may be interconnected to additional EIWCCs for single surface use or simultaneous cooking. The EIWCC may be used to charge other induction devices. In operation, the EIWCC may be used in multiple orientations including but not limited to horizontal, diagonal, and inverted orientations. The EIWCC may include remote operation, voice command control, auxiliary stackable induction charging batteries, QR identification pairing, and boil over protection by vibration, frequency, temperature sensors.

Figure 2:
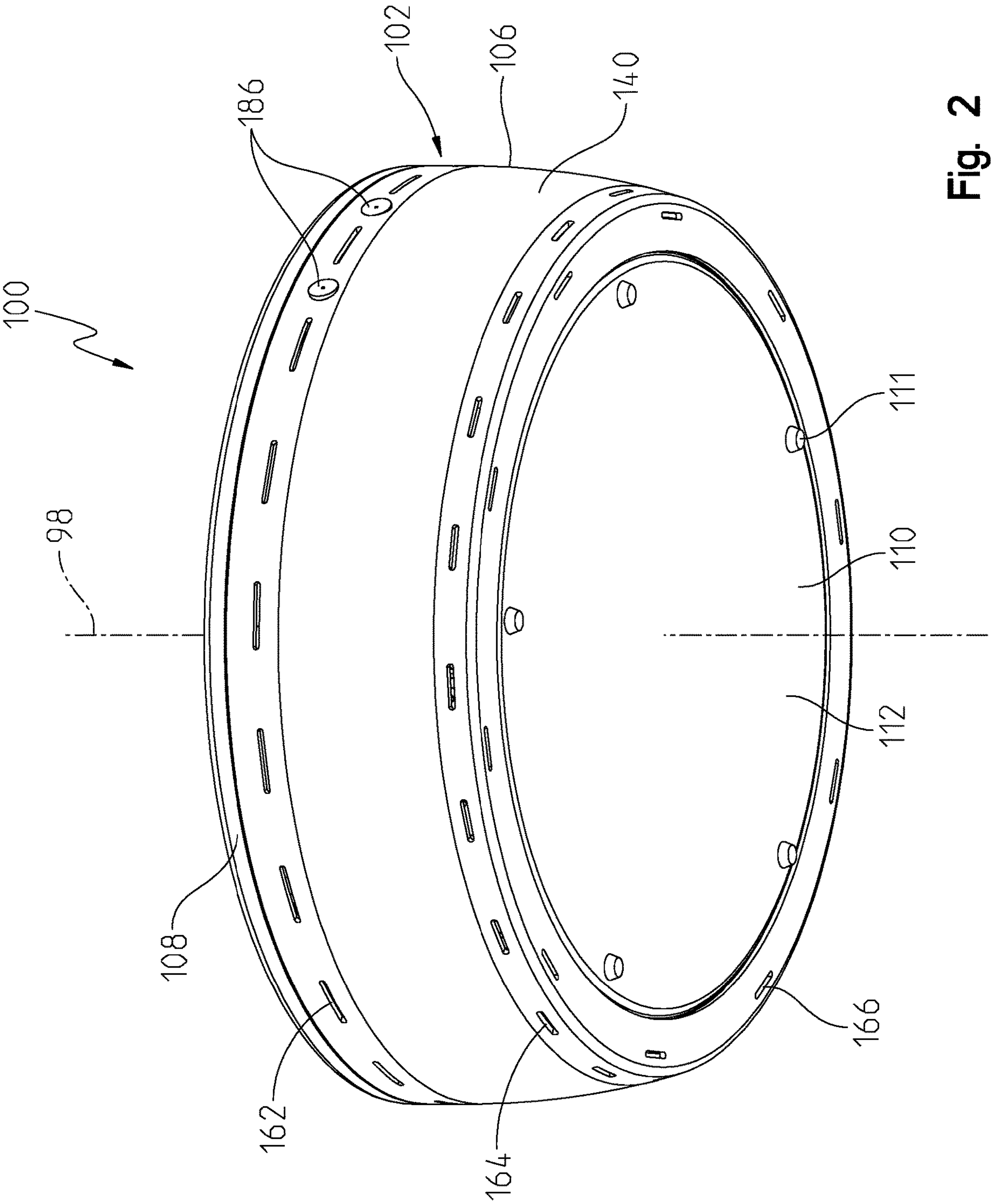
FIG. 2 is bottom-up perspective view of the cooking device showing that the cooking device includes a heat sink having a floor that cooperates with the non-ferromagnetic surface and the lower shell to define the housing.

Referring now to FIGS. 1-2, an illustrative embodiment of a cooking device 100 is shown. The cooking device 100 includes a housing 102 including a non-ferromagnetic surface 104 and a lower shell 106 positioned below the non-ferromagnetic surface 104. In the illustrative embodiment, the non-ferromagnetic surface 104 is made of a first material (such as glass, ceramic, or both) and the lower shell 106 is made of a second material (such as plastic or another non-ferromagnetic material). In the illustrative embodiment, the non-ferromagnetic surface 104 is a thin, flat surface configured to facilitate passage of a magnetic field therethrough. The non-ferromagnetic surface 104 is configured to receive a cooking vessel formed of a ferrous material, which is configured to receive an electrical current generated by the magnetic field passing through the non-ferromagnetic surface 104.

Figure 3:
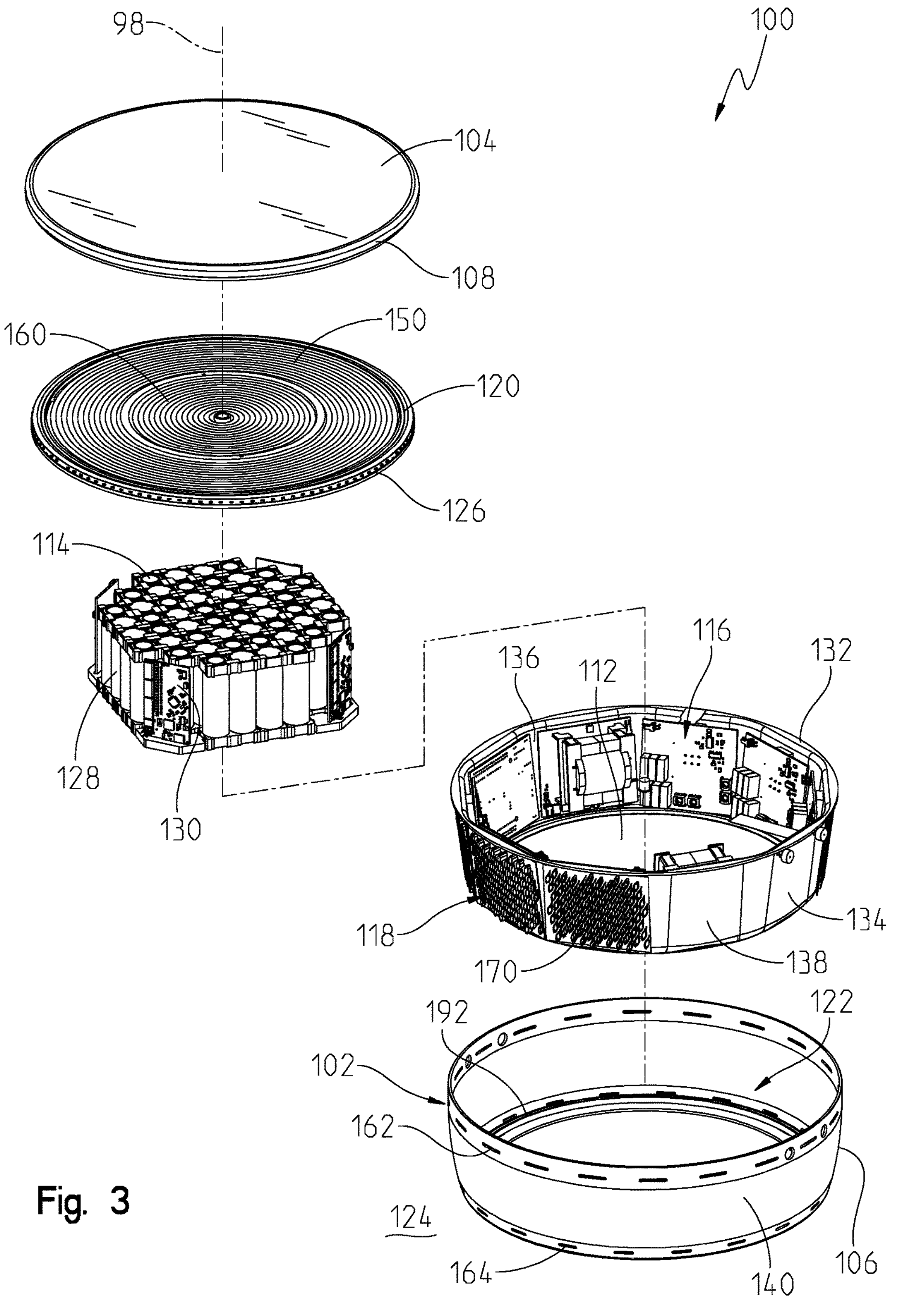
FIG. 3 is an exploded view of the cooking device showing: the non-ferromagnetic surface positioned within a retaining ring, which also surrounds an induction cooking coil and a lighting strip.

As shown in FIGS. 1-3, the cooking device 100 includes a longitudinal axis 98 extending therethrough. The longitudinal axis 98 extends in a vertical direction when the cooking device 100 is positioned on a flat level surface. In the illustrative embodiment, the housing 102 of the cooking device 100 has a cylindrical shape such that the longitudinal axis 98 is the central axis of the cylinder. As shown in FIGS. 1-3, the housing 102 of the cooking device 100 further includes a retaining ring 108. FIG. 3 is an exploded view of the cooking device 100 and shows that the non-ferromagnetic surface 104 is positioned radially inward of the retaining ring 108. As used herein, the terms radial and radially refer to the direction perpendicular to the longitudinal axis 98. In the illustrative embodiment, the retaining ring 108 abuts the non-ferromagnetic surface 104 and the lower shell 106. For example, as shown in FIGS. 1-2, the retaining ring 108 is positioned above and supported by a top edge of a continuous side wall 140 of the lower shell 106.

FIG. 2 shows an underside of the housing 102 of the cooking device 100. In the illustrative embodiment, the cooking device 100 includes a heat sink 110 having a floor 112 that cooperates with the lower shell 106, the non-ferromagnetic surface 104, and the retaining ring 108 to form the housing 102. In some embodiments, the lower shell 106 extends below and around the floor 112 of the heat sink 110 to form the entirety of the bottom surface of the housing 102. The bottom surface of the housing 102 may include a plurality of feet 111 coupled thereto for stability, leveling, and avoidance of slippage. Referring still to FIGS. 1-3, the lower shell 106 includes lower apertures 162 and upper apertures 164 formed therethrough that facilitate airflow between an interior 122 and an exterior 124 of the housing 102. In the illustrative embodiment the lower and upper apertures 162, 164 are formed in and extend through the continuous side wall 140 of the lower shell 106. The upper apertures 164 are positioned above the lower apertures 162 in the vertical direction but not aligned with the lower apertures 162. The misalignment of the lower and upper apertures 162, 164 encourages rotational airflow between the interior 122 and exterior 124 of the housing 102. As shown in FIG. 2, the lower shell 106 further includes one or more drainage openings 166 positioned at the underside of the housing 102 of the cooking device 100.

As shown in FIG. 3, several components of the cooking device 100 are enclosed within the housing 102 of the cooking device 100. For example, a battery assembly 114, a circuit board assembly 116, cooling fins 118, and an induction cooking coil 120 are among the components of the cooking device 100 that are enclosed within the housing 102. In the illustrative embodiment, the components are enclosed entirely within the housing 102. Such enclosure is advantageous for at least durability, storage, water resistance, and safety of the cooking device 100. However, enclosure of such components may create challenges associated with heat generation. For example, the enclosed components may generate heat, which is difficult to exhaust from the interior 122 to the exterior 124 of the housing 102. Exhausting heat from the interior 122 to the exterior 124 or otherwise facilitating cooling is made more challenging without a fan, blower, vacuum or related airflow device; however, it is advantageous to provide the cooking device 100 without a fan, blower, or similar device. For example, omission of a fan, a blower, or similar device may reduce noise, power requirements, and allow for optimized spacing of other components in the interior 122 of the housing 102. Aspects of the disclosure described herein provide cooling airflow or heat dissipation, for example, in lieu of a fan, blower, or similar device.

As mentioned, FIG. 3 shows an exploded view of the cooking device 100. In the illustrative embodiment, the induction cooking coil 120 is positioned adjacent to and below the non-ferromagnetic surface 104. In the illustrative embodiment, a lighting strip 126 (e.g., LED lights) is positioned radially outward of the induction cooking coil 120 and radially within the retaining ring 108. The lighting strip 126 is adjacent to and below the non-ferromagnetic surface 104.

Figure 4:
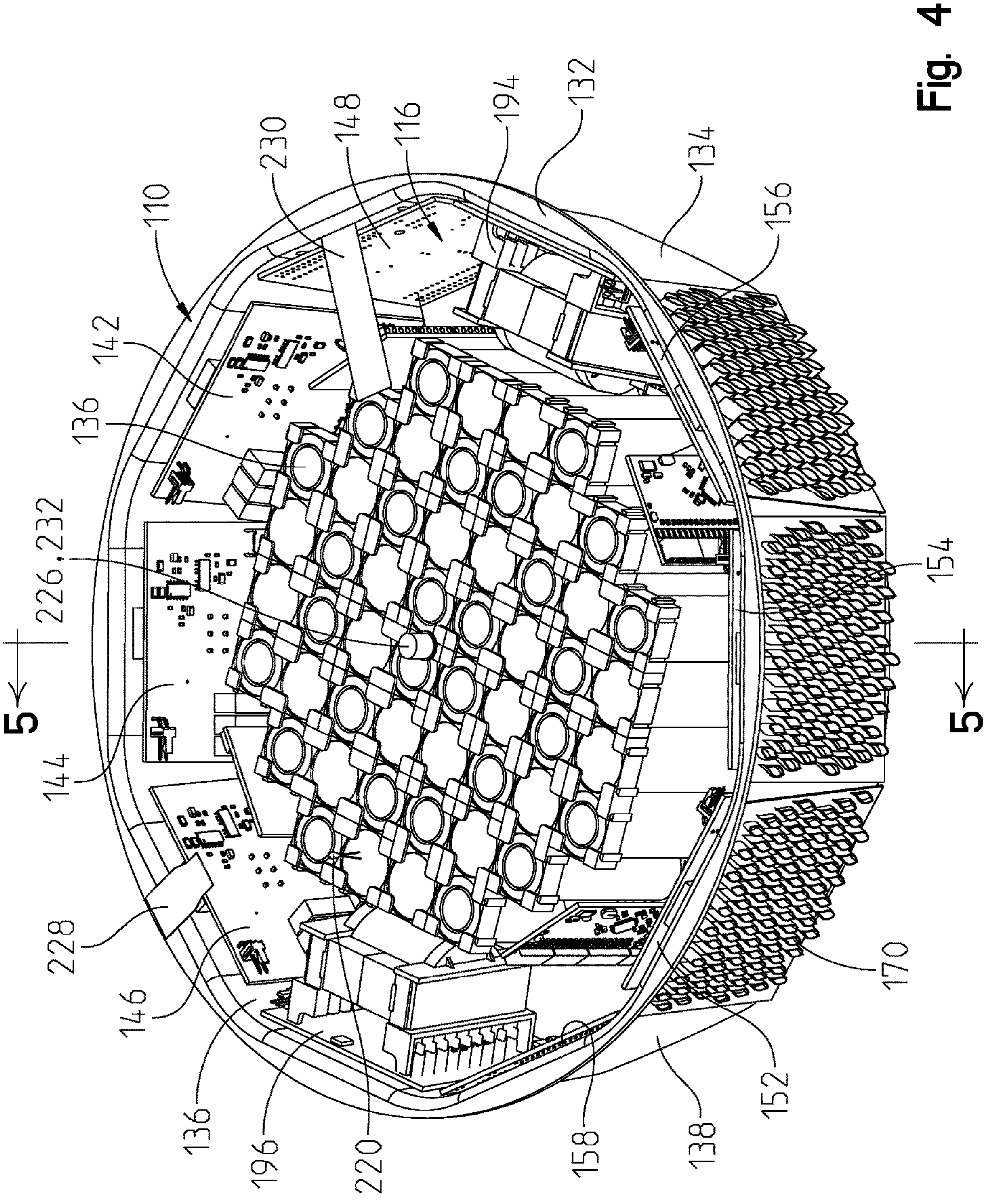
FIG. 4 is a top down perspective view of the heat sink, the battery assembly, the circuit board assembly, the plurality of cooling fins, and a plurality of sensors.

As shown in FIGS. 3 and 4, the cooking device 100 further includes the battery assembly 114 positioned radially within the heat sink 110, which is positioned radially inward of the continuous side wall 140 of the lower shell 106. The battery assembly 114 includes one or more batteries 128 and one or more battery circuit boards 130 configured to facilitate power transfer to and from the one or more batteries 128. In some embodiments, the one or more battery circuit boards 130 may be positioned adjacent to (e.g., above or below) the one or more batteries 128 to provide support to the one or more batteries 128. For example, the one or more battery circuit boards 130 may be welded or otherwise coupled to the one or more batteries 128 at various locations such that the couplings fix the two component together and provide electrical connections therebetween. The battery assembly 114 is configured to provide power to the induction cooking coil 120.

In some embodiments, a casing extends around the battery assembly 114. The casing includes a side wall (which is, for example, continuous) that is positioned radially outward of the battery assembly 114. The casing further includes a top wall coupled to the upper edge of the continuous side wall. The top wall is positioned above the battery assembly 114. The casing includes an opening formed by a bottom edge of the continuous side wall 140, and the battery assembly 114 may be inserted into and removed from the casing by passing through the opening. In some embodiments, the housing 102 may include an aperture to facilitate insertion and removal of the battery assembly 114 and casing into and out of the housing 102.

Figure 5:
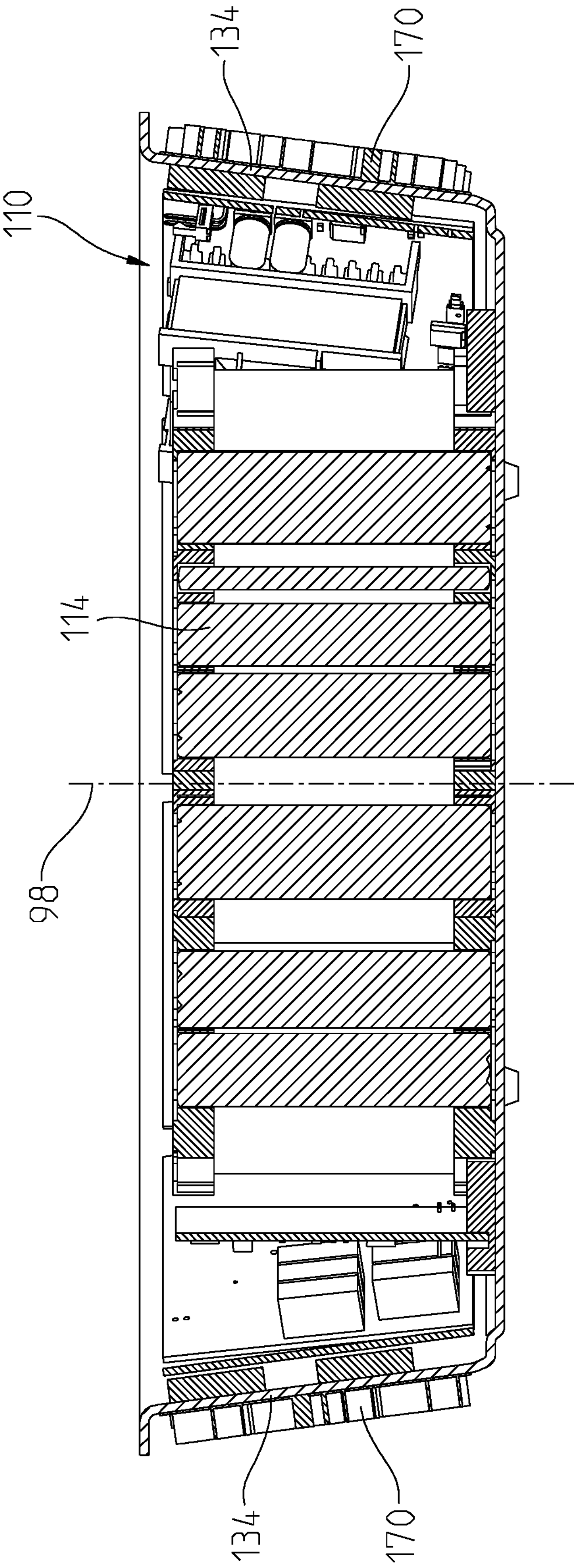
FIG. 5 is a cross section view taken at the cross-section line shown in FIG. 4 showing that receiving walls of the heat sink are non-parallel to a longitudinal axis of the cooking device that is defined through a center point of the non-ferromagnetic surface (which is, for example, circular)

As shown in FIGS. 3-5, the heat sink 110 includes a collar 132 coupled to the floor 112. In the illustrative embodiment, the collar 132 is a continuous structure including receiving walls 134 spaced radially outward of the battery assembly 114. The collar 132 includes a radially inner surface 136 facing toward the longitudinal axis 98 and a radially outer 138 surface facing away from the longitudinal axis 98. In the illustrative embodiment, each receiving wall 134 is spaced an equal distance radially from the longitudinal axis 98. As shown in FIG. 5, in the illustrative embodiment, the receiving walls 134 extend radially outward from the longitudinal axis 98 as the receiving walls 134 extend vertically upward toward the non-ferromagnetic surface 104 such that the receiving walls 134 are not parallel to the longitudinal axis 98. The non-parallel orientation of the receiving walls 134 relative to the longitudinal axis 98 creates additional space radially inward of an upper portion of the collar 132 (as compared to a lower portion of the collar 132), which facilitates cooling by providing space for rising heat generated by the circuit board assembly 116. In the illustrative embodiment, the heat sink 110 includes ten receiving walls 134 with curved walls positioned between each receiving wall 134 to form the continuous structure of the collar 132. In some embodiments, the heat sink 110 may be a multi-layer structure that has the advantage of reduced vibration as compared to a single layer structure.

In some embodiments, the receiving walls 134 and the floor 112 are formed as a flat continuous structure, and the receiving walls 134 are pivoted relative to the floor 112 to form an angle between the receiving walls 134 and the floor 112. This manufacturing process is advantageous for cost savings and easy of assembly.

As shown in FIGS. 3-5, in the illustrative embodiment, the circuit board assembly 116 includes a plurality of circuit boards coupled to the radially inner surface 136 of the collar 132 of heat sink 110. In other words, the circuit board assembly 116 (and each circuit board thereof) is positioned radially outward of the battery assembly 114 and radially inward of the collar 132. Each circuit board of the circuit board assembly 116 is coupled to a radially inner surface of a receiving wall 134 of the collar 132. It should be appreciated that the surface of each circuit board coupled to a receiving wall 134 is flat (i.e., planar), and therefore, the radially inner surface of each receiving wall 134 is likewise flat (i.e., planar).

In the illustrative embodiment, the circuit board assembly 116 includes a plurality of driver circuits and a plurality of voltage change circuits. As shown diagrammatically in FIG. 6, in the illustrative embodiment, voltage change circuits are coupled to and configured to receive power from the battery assembly 114 at a first voltage. The voltage change circuits are also coupled to and configured to provide power to the driver boards at a second voltage (e.g., greater than the first voltage). In some embodiments, the voltage change circuits are configured to receive DC power from the battery assembly 114 and provide AC power to the driver boards. The driver boards are coupled to and configured to transfer power to the induction cooking coil 120 at the second voltage.

Figure 6:
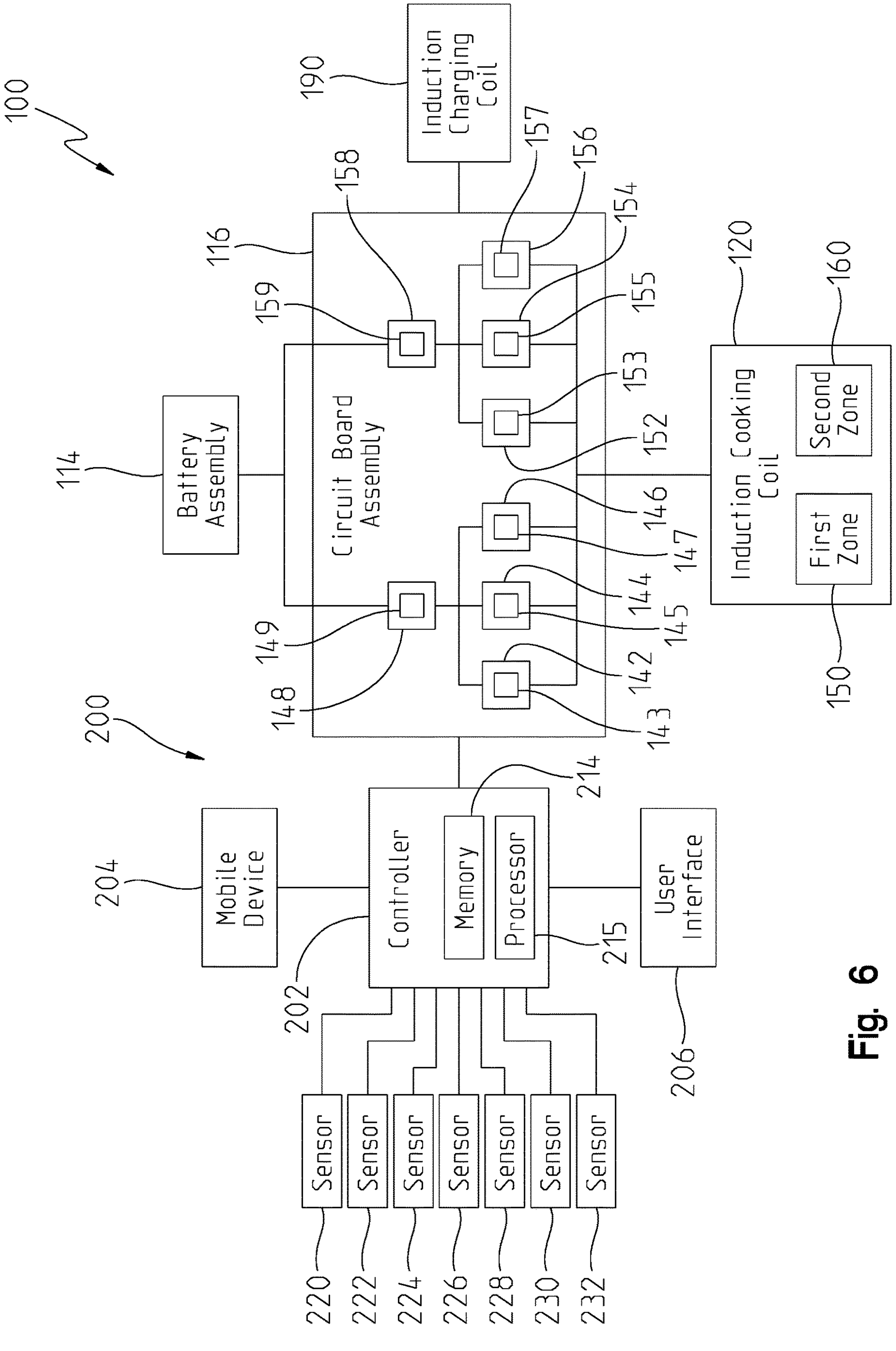
FIG. 6 is a control system including a controller configured to switch between operation of different driver circuits (which are, for example, positioned on different circuit boards of the circuit board assembly) to power the induction cooking coil.

Referring to FIGS. 4 and 6, in the illustrative embodiment, the circuit board assembly 116 includes a first driver circuit board 142 having a first driver circuit 143, a second driver circuit board 144 having a second driver circuit 145, a third driver circuit board 146 having a third driver circuit 147, and a first voltage change circuit board 148 having a first voltage change circuit 149 operatively coupled to each of the first, second, and third driver circuits 143, 145, 147. In the illustrative embodiment, the driver circuits 143, 145, 147 are configured to provide power to a first zone 150 of the induction cooking coil 120. In the illustrative embodiment, only a single driver circuit (e.g., 143, 145, or 147) may power the first zone 150 of the induction cooking coil 120 at a time.

Referring still to FIGS. 4 and 6, in the illustrative embodiment, the circuit board assembly 116 includes a fourth driver circuit board 152 having a fourth driver circuit 153, a fifth driver circuit board 154 having a fifth driver circuit 155, a sixth driver circuit board 156 having a sixth driver circuit 157, and a second voltage change circuit board 158 having a second voltage change circuit 159 operatively coupled to each of the fourth, fifth, and sixth driver circuits 153, 155, 157. In the illustrative embodiment, the fourth, fifth, and sixth driver circuits 153, 155, 157 are configured to provide power to a second zone 160 of the induction cooking coil 120. In the illustrative embodiment, only a single driver circuit (e.g., 153, 155, or 157) may power the second zone 160 of the induction cooking coil 120 at a time. It should be appreciated that additional driver circuits and, in some embodiments, additional corresponding voltage change circuits are contemplated by the disclosure, and such additional components would function equivalently to the components described herein.

In some embodiments, if the first and second zones 150, 160 are operated at the same temperature, a single driver circuit (e.g., 143, 145, 147, 153, 155, 157) may power the first and second zones 150, 160. However, if the first and second zones 150, 160 are operated at different temperatures, one of the driver circuits 143, 145, 147 powers the first zone 150, and one of the driver circuits 153, 155, 157 powers the second zone 160.

In other examples, the circuits may be arranged differently on a circuit board assembly that could replace the circuit board assembly 116 described herein. For example, in some embodiments, such a circuit board assembly may include a separate voltage change circuit corresponding to each driver circuit. For example, the circuit board assembly may include six voltage-change-and-driver circuit boards each including a driver circuit operatively coupled to a corresponding voltage change circuit.

In other examples, the circuit board assembly 116 may be devoid of the first voltage change circuit board 148, the first voltage change circuit 149, the second voltage change circuit board 158, and the second voltage change circuit 159. In the illustrative embodiment, the driver circuits 143, 145, 147, 153, 155, 157 receive power directly from the battery assembly 114 and provide power to the induction cooking coil 120. In the illustrative embodiment, a driver circuit (e.g., 143, 145, 147, 153, 155, 157) receives power from the battery assembly 114 at a first voltage. Due to interaction between the driver circuit and the induction cooking coil 120, the induction cooking coil 120 receives power from the driver circuit at a second voltage that is greater than the first voltage. Other arrangements are also within the scope of this disclosure, so long as such arrangements include driver circuits arranged in separate locations.

In some embodiments, each circuit board (e.g., 142, 144, 146, 152, 154, 156) is surrounded by a cartridge. A top portion of each circuit board may extend through a top side of each cartridge. The cartridges prevent water and debris from contacting the circuit boards. In the illustrative embodiments, a radially inner side of the continuous side wall 140 of the lower shell 106 may include guide rails, and each cartridge may positioned between adjacent guide rails. In the illustrative embodiment, each cartridge is formed of a top portion, a bottom portion, side portions, a front wall, and a plurality of rear walls. In this embodiment, the rear walls have the characteristics of the receiving walls described herein, and as such, the receiving walls form a heat sink. In the illustrative embodiment, the cooling fins described herein may be coupled to radially outer surfaces the receiving walls of the heat sink.

In some embodiments, a cooking device may include the components described above, wherein the components are arranged in a different configuration. In such embodiments, a battery assembly may be positioned adjacent to and below an induction cooking coil, which is positioned adjacent to and below a non-ferromagnetic (e.g., glass) surface. A heat sink may be positioned adjacent to and below the battery assembly. A circuit board assembly may be positioned below the heat sink, and one or more cooling fins may be positioned below the circuit board assembly. In this arrangement, a housing is formed by the non-ferromagnetic surface and by a lower shell that is positioned below the non-ferromagnetic surface. In the illustrative embodiment, the one or more cooling fins cooperate with the non-ferromagnetic surface and the lower shell to form the housing. The battery assembly, the induction cooking coil, and the circuit board assembly, are enclosed by the housing.

As shown in FIG. 6, in the illustrative embodiment, the cooking device 100 includes a control system 200 including a controller 202. The control system 200 further includes one or more memories 214 accessible by the controller 202 and one or more processors 216 accessible by the controller 202. The one or more processors 216 are configured to execute instructions (e.g., algorithmic steps) stored on the one or more memories 214. The controller 202 may be a single controller or a plurality of controllers operatively coupled to one another. The controller 202 may be included on the cooking device 100 or positioned remotely, away from the cooking device 100. For example, the controller 202 or plurality of controllers may be distributed on one or more circuit boards (such as a first control circuit board 194 and a second control circuit board 196 of the circuit board assembly 116). The controller 202 may be coupled via a wired connection or wirelessly to other components of the cooking device 100 and to one or more remote devices. In some instances, the controller 202 may be connected wirelessly via Wi-Fi, Bluetooth, Near Field Communication, or another wireless communication protocol to other components of the cooking device 100 and to one or more remote devices. For example, the controller 202 may be connected to a mobile device 204 configured to facilitate operation of an App for controlling the cooking device 100. The mobile device 204 (or another device) may include a user interface 206 operatively coupled to the controller 202 and configured to provided thereto information input by a user. The user interface 206 may receive information from the controller 202 indicative an operation or measurement of the cooking device 100. The user interface 206 may include a microphone, speaker, touch screen, or other components configured to allow the user to receive and input information in various ways.

As shown in FIG. 6, the controller 202 is operatively coupled to the circuit board assembly 116. The controller 202 is configured to switch between usage of the first driver circuit 143, the second driver circuit 145, and the third driver circuit 147 to power the first zone 150 of induction cooking coil 120 with one of the driver circuits 143, 145, 147. Similarly, the controller 202 is configured to switch between usage of the fourth driver circuit 153, the fifth driver circuit 155, and the sixth driver circuit 157 to power the second zone 160 of induction cooking coil 120 with one of the various driver circuits 153, 155, 157. Moreover, the controller 202 is configured to switch between usage of each driver circuit 143, 145, 147, 153, 155, 157 to power the first and second zones 150, 160 of the induction cooking coil 120 if the first and second zones 150, 160 are operated at the same temperature.

In some embodiments, the controller 102 is configured to switch between operation of the various driver circuits to maintain equivalent time or load usage between or among the driver circuits. In some embodiments, the controller 102 is configured to switch between operation of the various driver circuits after a predetermined amount of time to induce airflow within the interior 122 of the housing 102.

In use, during operation of the first driver circuit 143 produces heat until operation of the first driver circuit 143 is ceased by the controller 202, and likewise, operation of the second driver circuit 145 produces heat until operation of the first driver circuit 143 is ceased by the controller 202. This may be referred to as switching "on" and "off" the first and second driver circuits 143, 145. As a result of the switching "on" and "off" the various driver circuits, rotational or other airflow is produced (as a result of high and low pressure areas resulting from by-product heat produced during operation of the driver circuits) throughout the interior 122 of the housing 102. Such airflow facilitates cooling and heat dissipation.

Moreover, because the controller 102 is configured to switch between operation of various driver circuits, power can be provided to the induction cooking coil 120 without overheating any one driver circuit. For example, as shown in FIGS. 4 and 6, the control system 200 may include a sensor 220 that is embodied as a thermistor-type temperature sensor configured to measure a temperature associated with a driver circuit (e.g., 143). In some embodiments, the control system 200 may include a separate temperature sensor (e.g. 220, 222, 224) corresponding to each drive circuit (e.g., 143, 145, 147). In this example, the controller 202 is configured to switch from usage of the first driver circuit 143 to the second driver circuit 145 (or the third driver circuit 147) to power the induction cooking coil 120 in response to receiving a signal from the sensor 220 indicative of the measured temperature of the first driver circuit 143, and determining that the measured temperature of the first driver circuit 143 is outside an acceptable temperature range. Similarly, the controller 202 is configured to switch from usage of the second driver circuit 145 to the first driver circuit 143 (or third driver circuit 147) to power the induction cooking coil 120 in response to receiving a signal from the sensor 222 indicative of the measured temperature of the second driver circuit 145, and determining that the measured temperature of the second driver circuit 145 is outside an acceptable temperature range. Similarly, the controller 202 is configured to switch from usage of the third driver circuit 147 to the first driver circuit 143 (or second driver circuit 145) to power the induction cooking coil 120 in response to receiving a signal from the sensor 224 indicative of the measured temperature of the third driver circuit 147, and determining that the measured temperature of the third driver circuit 147 is outside an acceptable temperature range. Each acceptable temperature range may be based on one or more predetermined values stored on the one or more memories 214. It should be appreciated that the disclosure of this paragraph and the preceding paragraph may apply equally to the fourth, fifth, and sixth driver circuits 153, 155, 157 described herein. For example, the control system 200 may include separate temperature sensors corresponding to each of the driver circuits 153, 155, 157.

As shown in FIGS. 4 and 6, the control system 200 may include additional sensors 226, 228, 230, and 232. Each sensor described herein is operatively coupled to the controller 202 and configured to send signals thereto indicative of the information measured by the sensor. For example, in some embodiments, the cooking device 100 includes the sensor 226 that is embodied as an infrared-type temperature sensor configured to measure a temperature associated with a cooking vessel atop the non-ferromagnetic surface 104. In some embodiments, the cooking device 100 includes the sensor 228 that is embodied as a pressure or force response sensor, which is configured to measure the downward force applied by the cooking vessel on the non-ferromagnetic surface 104. In some embodiments, the cooking device 100 includes the sensor 230 that is embodied as a vibration sensor, which is configured to measure the frequency of vibration of the non-ferromagnetic surface 104 or another component of the cooking device 100. In some embodiments, the cooking device 100 includes the sensor 232 that is embodied as an accelerometer, which is configured to measure the tilt, change in tilt, or both relative to, for example, a level surface.

Referring again to FIGS. 3-5, in the illustrative embodiment, the cooking device 100 includes cooling fins 170 coupled to the radially outer surface 138 of the collar 132 of the heat sink 110. In other words, each cooling fin 170 is positioned radially outward of the heat sink 110 and radially inward of the lower shell 106. Each cooling fin 170 is coupled to a radially outer surface of a receiving wall 134 of the heat sink 110. In some embodiments, the cooling fins 170 are embodied as a portion of (and are monolithic with) the heat sink 110.

Figure 7:
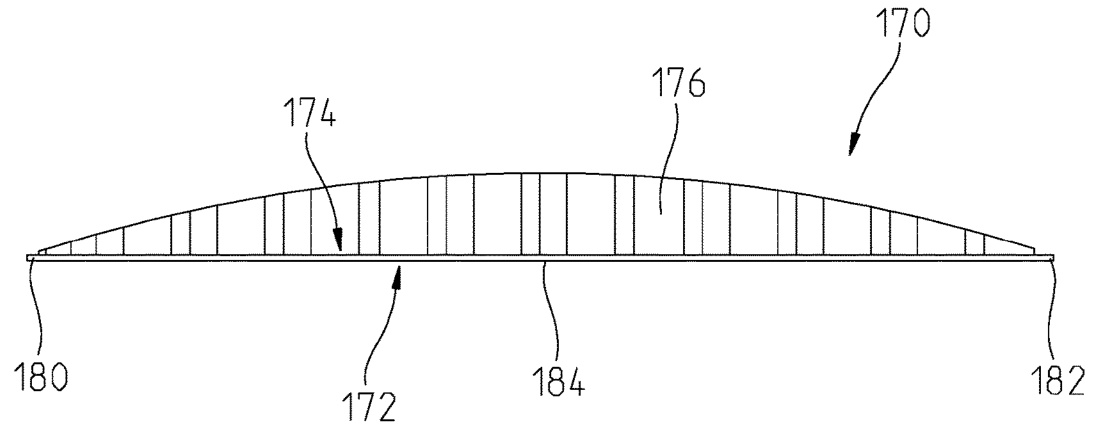
FIG. 7 is a side view of a cooling fin of the plurality of cooling fins showing that the cooling fin includes raised walls defining a convex shape of the cooling fin.
Figure 8:
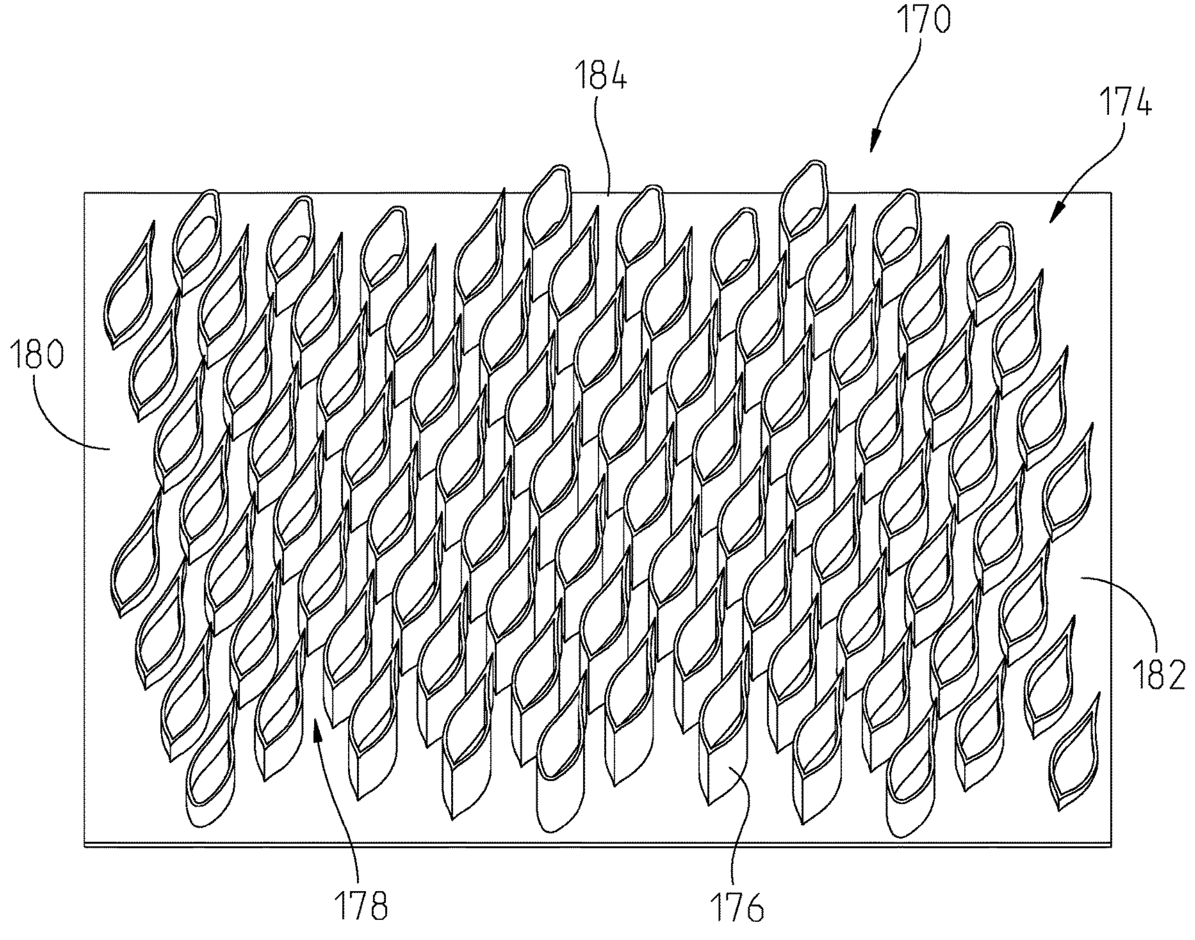
FIG. 8 is a front perspective view of a cooling fin of the plurality of cooling fins showing the shape of the raised walls and that the raised walls include channels defined therebetween (for example, oriented in the direction of airflow in an interior of the housing of the cooking device.

As shown in FIGS. 7 and 8, each cooling fin 170 includes a first surface 172, a second surface 174 opposite the first surface 172, and raised walls 176 extending outwardly from the second surface 174. The first surface is flat (i.e., planar), and therefore, the radially outer surface of each receiving wall is likewise flat (i.e., planar). In the illustrative embodiment, as shown in FIGS. 7 and 8, the raised walls 176 are shaped as tear drops, forming channels 178 therebetween. Each tear drop shape includes a first narrow end, a second narrow end and a middle portion between the first and second narrow ends that is wider than the first and second narrow ends. The tear drop shape provides sufficient surface area to facilitate adequate cooling while also encouraging airflow between the channels 178 with limited interference.

In some embodiments, the cooling fins 170 are arranged adjacent to one another such that the channels 178 of each cooling fin 170 align with the channels 178 of the adjacent cooling fins 170. In the illustrative embodiment, the channels 178 are oriented in the direction of airflow in the interior 122 of the housing 102. For example, airflow resulting from the misalignment of the lower and upper apertures 162, 164, or airflow resulting from the switching "on" and "off" of the first, second, and third driver circuits 143, 145, 147 moves in the direction of the channels 178. The orientation of the channels 178 in the direction of airflow in the interior of the housing 102 facilitates optimal cooling of via the cooling fins 170. For example, the cooling fins 170 capture heat from the driver circuits 143, 145, 147 that is dissipated more quickly when a greater amount of airflow passes through the channels 178. In other examples, the lower and upper apertures 162, 164 may be aligned with one another for ease of manufacture and other purposes, and the directional airflow described above is induced by the switching "on" and "off" of the first, second, and third driver circuits 143, 145, 147, for example, without the misaligned apertures.

As shown in FIG. 8, the raised walls 176 vary in height across each cooling fin 170. In As shown, each cooling fin 170 includes a first side 180, a second side 182, and a middle portion 184 positioned between the first and second sides 182, 184. The raised walls 176 have a lesser height at the first and second sides 180, 182 of each cooling fin 170 and a greater height at the middle portion 184 of each cooling fin 170. As such, each cooling fin 170 has a convex shape, as shown in FIG. 7. The convex shape of each cooling fin 170 is advantageous because it allows the raised walls 178 to have maximized height dimensions, which facilitates more heat transfer away from the driver circuits (e.g., 143, 145, 147) while accommodating the space constraints of the interior 122 of the housing 102 (that is, for example, a cylindrical shape). Thus, in the illustrative embodiment, the convex shape of each cooling fin 170 approximates the curvature of the radially inner side of the continuous side wall 140 of the lower shell 106 of the housing 102.

In other embodiments, the cooling fins 170 take the place of the receiving walls 134, which are omitted from the cooking device. In such embodiments, the cooling fins 170 may be coupled to one another at their first and second sides 180, 182, coupled to the floor 112, or both. In such embodiments, the heat sink 110 may be formed by only the floor 112.

Figure 9:
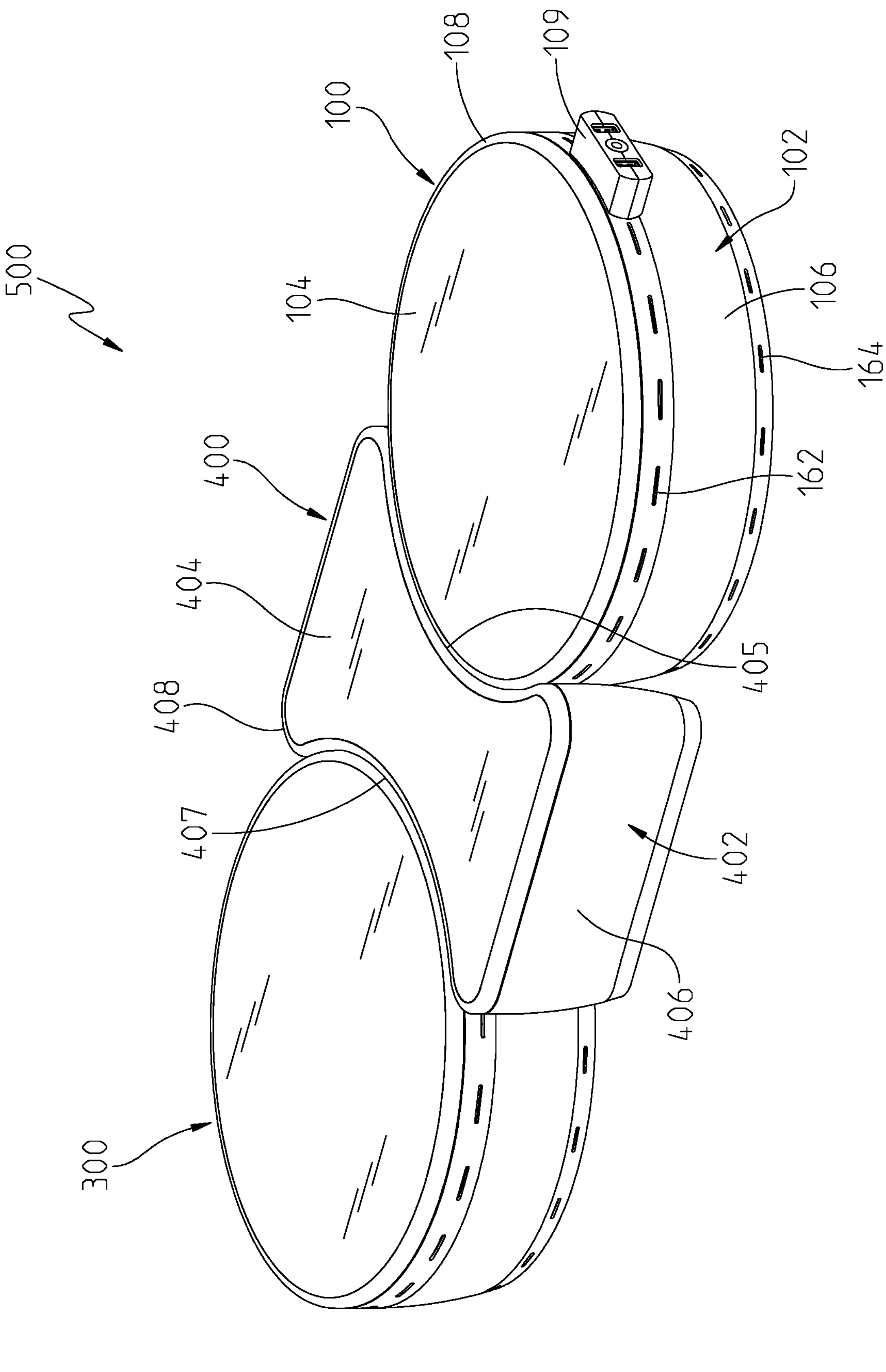
FIG. 9 is a perspective view of a cooking system including: the cooking device illustrated in FIGS. 1-8 with a power adapter coupled thereto; another cooking device identical to the cooking device illustrated in FIGS. 1-8; and a bridge positioned between the cooking devices.

Referring now to FIG. 9, in the some embodiments, the cooking device 100 may be included in a cooking system 500. The cooking system 500 may also include a cooking device 300, which is identical to the cooking device 100, and a bridge 400. In the illustrative embodiment, the bridge 400 includes a housing 402 having a first receiving portion 405 that is configured to couple with the cooking device 100 and a second receiving portion 407 that is configured to couple with the cooking device 300. Thus, as shown in FIG. 9, in the cooking system 500, the bridge 400 is positioned between the cooking device 100 and the cooking device 300.

As shown in FIGS. 1-2, the cooking device 100 includes one or more attachment features 186 positioned on a first side of the housing 102 and one or more attachment features 188 positioned on a second side of the housing 102. As shown in FIG. 9, the one or more attachment features 186, 188 are each couplable (for example, magnetically) to a power adapter 190. The power adapter 190 may include a curved surface approximating the curvature of the lower shell 106 of the housing 102. The power adapter 190 may include, for example, a port configured to receive a wired charging device and may include one or additional ports configured to receive a USB or other wired input. In other embodiments, the cooking device 100 may include an induction charging coil 192 (see FIG. 3) configured to receive an electrical current via a magnetic field produced by a nearby, separate coil. The separate coil may be included in a docking device having a casing surrounding the separate coil. The casing may include a first flat top surface sized and shaped to receive and support the cooking device 100. In some embodiments, the docking device includes a plurality of flat top surfaces including the first surface configured to receive the cooking device 100, a second surface configured to receive the cooking device 300, and a third surface configured to receive the bridge 400. In the examples described, the battery assembly 114 is configured to receive power from the wired charging device via the power adapter 190, from the induction charging coil 192, or both.

Figure 10:
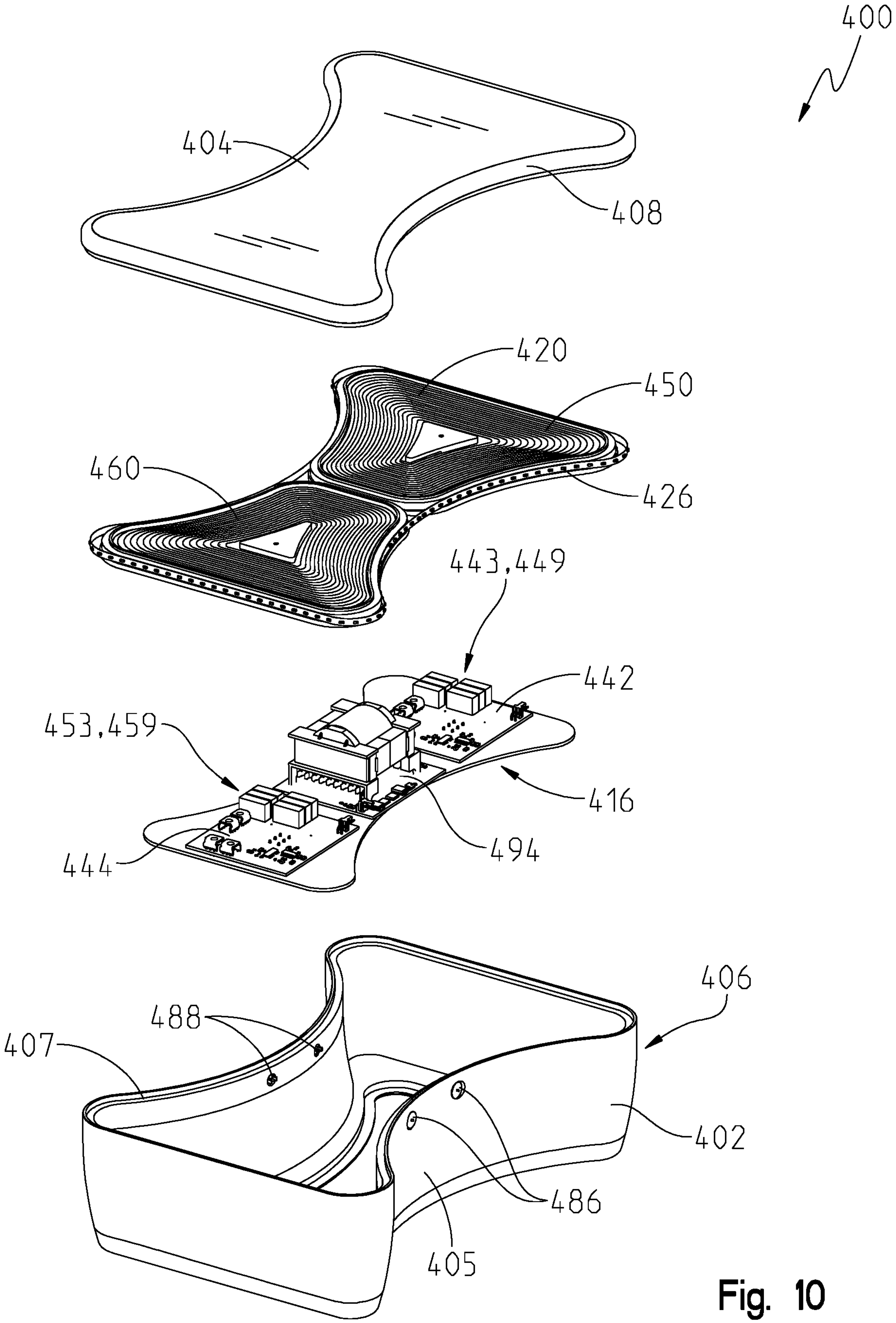
FIG. 10 is an explode view of the bridge showing that the bridge includes a non-ferromagnetic surface and a lower shell defining a housing with an induction cooking coil and a circuit board assembly positioned therein.

It should be appreciated that the one or more attachment features 186, 188 of the cooking device 100 are each couplable (for example, magnetically) to corresponding one or more receiving features 486, 488 of the bridge 400 (see FIG. 10). The receiving features 486 are positioned on the first receiving portion 405 of the housing 402, and the receiving features 488 are positioned on the second receiving portion 407 of the housing 402. The receiving portions 405, 407 of the bridge 400 are each curved to approximate the curvature of the lower shell 106 of the housing 102 of the cooking device 100 (and that of the cooking device 300).

As shown in FIG. 10, (which is an exploded view of the bridge 400) the housing 402 includes a retaining ring 408 and a non-ferromagnetic surface 404 positioned within the retaining ring 408. The housing 402 further includes a lower shell 406 positioned below the non-ferromagnetic surface 404. In the illustrative embodiment, the non-ferromagnetic surface 404 is made of a first material (such as glass, ceramic, or both) and the lower shell 406 is made of a second material (such as plastic or another non-ferromagnetic material). In the illustrative embodiment, the non-ferromagnetic surface 404 is a thin, flat surface configured to facilitate passage of a magnetic field therethrough. The non-ferromagnetic surface 404 is configured to receive a cooking vessel formed of a ferrous material, and the cooking vessel is configured to receive an electrical current generated by the magnetic field passing through the non-ferromagnetic surface 104 to produce heat.

As shown in FIG. 10, in the illustrative embodiment, the bridge 400 includes an induction cooking coil 420 positioned adjacent to and below the non-ferromagnetic surface 404. In the illustrative embodiment, a lighting strip 426 (e.g., LED lights) is positioned outward of the induction cooking coil 420 and within the retaining ring 408. The lighting strip 426 is adjacent to and below the non-ferromagnetic surface 404. The bridge 400 further includes a circuit board assembly 416 configured to provide power to the induction cooking coil 420.

In the illustrative embodiment, the circuit board assembly 416 includes a first driver circuit 443, a first voltage change circuit 449, a second driver circuit 453, and a second voltage change circuit 459. In the illustrative embodiment, the first driver circuit 443 and the first voltage change circuit 449 are positioned on a first circuit board 442, and the second driver circuit 453 and the second voltage change circuit 459 are positioned on a second circuit board 444. In the illustrative embodiment, the first voltage change circuit 449 and the second change circuit 459 are configured to receive power from the battery assembly 114 when the bridge 400 is coupled to the cooking device 100. The first and second voltage change circuits 449, 459 are configured to receive power from the battery assembly 114 at a first voltage and configured to provide power to the first and second driver circuits 443, 453, respectively, at a second voltage greater than the first voltage. In the illustrative embodiment, the first driver circuit 443 is configured to provide power to a first zone 450 of the induction cooking coil 420, and the second driver circuit 453 is configured to provide power to a second zone 460 of the induction cooking coil 420.

In the illustrative, embodiment the circuit board assembly 416 further includes a control circuit board 494 on which one or more controllers (e.g., 202) may reside. In the illustrative embodiment, the controller 202 may be operatively coupled to circuit board assembly 416 and configured to control operation of the circuits 443, 449, 453, 459 thereon. In the illustrative embodiment, the circuits 443, 449, 453, 459 are operable by the controller 202 (that is, for example, included at least in part in the cooking device 100) only when the cooking device 100 is coupled to the bridge 400.

In some embodiments, cooking device 100 may include a retainer that is coupleable to the housing 102 such that the retainer is positioned adjacent to (e.g., above) the non-ferromagnetic surface 104. In such embodiments, the retainer may include a bottom portion that is flat to approximate the non-ferromagnetic surface 104 and a top portion that is concave to approximate the bottom surface of a curved cooking vessel, which the top portion of the retainer is configured to receive. In some embodiments, the retainer is formed of a non-ferromagnetic surface. In some embodiments, a concave-shaped induction cooking coil is positioned within the retainer. In such embodiments, the concave-shaped induction cooking coil may replace or supplement the induction cooking coil 120.

While the disclosure has been illustrated and described in detail in the drawings and foregoing description, such illustration and description are to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present disclosure as defined by the appended claims.

The invention claimed is:

1. A cooking device, comprising:
- a longitudinal axis extending vertically through the cooking device;
- a housing including a non-ferromagnetic surface extending in a radial direction perpendicular to the longitudinal axis;
- an induction cooking coil positioned adjacent to and below the non-ferromagnetic surface;
- a battery assembly configured to provide power to the induction cooking coil;
- a heat sink including a collar having receiving walls spaced radially outward of the battery assembly;
- a circuit board assembly positioned radially outward of the battery assembly and radially inward of the collar;
- wherein at least one circuit board of the circuit board assembly is coupled to a receiving wall of the collar; and
- wherein the battery assembly, the induction cooking coil, and the circuit board assembly, are enclosed by the housing.

2. The cooking device of claim 1, wherein the housing further comprises a lower shell positioned below the non-ferromagnetic surface;
- wherein the heat sink includes a floor coupled to the collar and positioned radially inward of the lower shell; and
- wherein the floor of the heat sink cooperates with the lower shell and the non-ferromagnetic surface to form the housing.

3. The cooking device of claim 1, wherein the housing further comprises a lower shell having a continuous side wall positioned radially outward of the heat sink.

4. The cooking device of claim 3, wherein the housing further comprises a retaining ring abutting the lower shell and the non-ferromagnetic surface; and
- wherein the non-ferromagnetic surface is positioned radially inward of the retaining ring.

5. The cooking device of claim 1, wherein the receiving walls extend radially outward from the longitudinal axis as the receiving walls extend vertically upward toward the non-ferromagnetic surface such that the receiving walls are not parallel to the longitudinal axis.

6. The cooking device of claim 1, further comprising a plurality of cooling fins, wherein each cooling fin of the plurality of cooling fins includes:
- a first surface that is planar and coupled to the heat sink;
- a second surface opposite the first surface; and
- raised walls extending radially outward from the second surface, the raised walls defining channels therebetween.

7. The cooking device of claim 6, wherein the plurality of cooling fins is positioned radially outward of the heat sink; and
- wherein each cooling fin of the plurality of cooling fins is coupled to a receiving wall of the heat sink.

8. The cooking device of claim 6, wherein the raised walls vary in height from a lesser height at first and second sides of each cooling fin to a greater height at a middle portion of each cooling fin, the middle portion being positioned between the first and second sides of each cooling fin, such that each cooling fin has a convex shape.

9. The cooking device of claim 1, wherein the housing includes lower apertures and upper apertures that are positioned above the lower apertures; and wherein the upper apertures and the lower apertures facilitate airflow between an interior and an exterior of the housing.

10. The cooking device of claim 1, further comprising:

an induction charging coil spaced apart from the induction cooking coil;

wherein the circuit board assembly is configured to transfer power between the battery assembly and the induction charging coil.

11. The cooking device of claim 1, further comprising:

a controller operatively coupled to the circuit board assembly;

wherein a first driver circuit of the circuit board assembly and a second driver circuit of the circuit board assembly are each configured to receive power from the battery assembly and provide the received power to the induction cooking coil;

wherein the controller is configured to switch from usage of the first driver circuit to the second driver circuit to power the induction cooking coil; and wherein the first driver circuit and the second driver circuit are configured to provide power to the induction cooking coil at the same voltage.

12. The cooking device of claim 11, further comprising:

a sensor operatively coupled to the controller and configured to measure a temperature of the first driver circuit;

wherein the controller is configured to switch from usage of the first driver circuit to the second driver circuit to power the induction cooking coil in response to: receiving a signal from the sensor indicative of the measured temperature of the first driver circuit, and determining that the measured temperature of the first driver circuit is outside an acceptable temperature range.

13. The cooking device of claim 11, wherein the controller is configured to switch from usage of the first driver circuit to the second driver circuit to power the induction cooking coil after a predetermined amount of time to induce airflow within the housing.

14. A cooking device, comprising:

a longitudinal axis extending vertically through the cooking device;

a housing including: a circular non-ferromagnetic surface comprised of a first material and extending in a radial direction outward from and perpendicular to the longitudinal axis, and a cylindrical lower shell extending vertically downward from the non-ferromagnetic surface and comprised of a second material;

an induction cooking coil enclosed by the housing and positioned below the non-ferromagnetic surface;

a battery assembly enclosed by the housing and configured to provide power to the induction cooking coil via a circuit board assembly; and a heat sink including a collar positioned radially outward of and surrounding the battery assembly;

wherein at least one circuit board of the circuit board assembly is coupled to an inner surface of the heat sink.

15. The cooking device of claim 14, wherein the heat sink includes a floor coupled to a bottom edge of the collar; and wherein the floor of the heat sink cooperates with the non-ferromagnetic surface and the cylindrical lower shell to form the housing.

16. The cooking device of claim 14, further comprising:

a controller operatively coupled to the circuit board assembly;

wherein the controller is configured to switch from usage of a first driver circuit of the circuit board assembly to a second driver circuit of the circuit board assembly to power the induction cooking coil; and wherein the first driver circuit and the second driver circuit are configured to provide power to the induction cooking coil at the same voltage.

17. The cooking device of claim 14, further comprising walls extending radially outward away from a radially outer surface of the collar;

wherein a plurality of channels are formed between the walls.

18. A cooking device, comprising:

a longitudinal axis extending vertically through the cooking device;

a housing including: a non-ferromagnetic surface that extends in a radial direction perpendicular to the longitudinal axis, and a lower shell that extends vertically downward from the non-ferromagnetic surface;

an induction cooking coil positioned below the non-ferromagnetic surface;

a battery assembly configured to provide power to the induction cooking coil via a circuit board assembly;

a heat sink adjacent to the battery assembly and the circuit board assembly;

a controller operatively coupled to the circuit board assembly; and a first driver circuit of the circuit board assembly operatively coupled to the controller configured to receive power from the battery assembly at the direction of the controller and provide the received power to the induction cooking coil;

wherein the induction cooking coil, the battery assembly, and the circuit board assembly are enclosed by the housing.

19. The cooking device of claim 18, wherein the controller is configured to switch from usage of a first driver circuit of the circuit board assembly to a second driver circuit of the circuit board assembly to power the induction cooking coil.

20. The cooking device of claim 18, wherein the heat sink includes a floor and a collar extending radially upward from the floor;

wherein the floor of the heat sink is positioned radially inward of the lower shell; and wherein the floor of the heat sink cooperates with the lower shell and the non-ferromagnetic surface to form the housing.

* * * * *